(No Model.)
P. ROHAN.
SHEARING MACHINE.
No. 478,023. Patented June 28, 1892.
Fig. I.
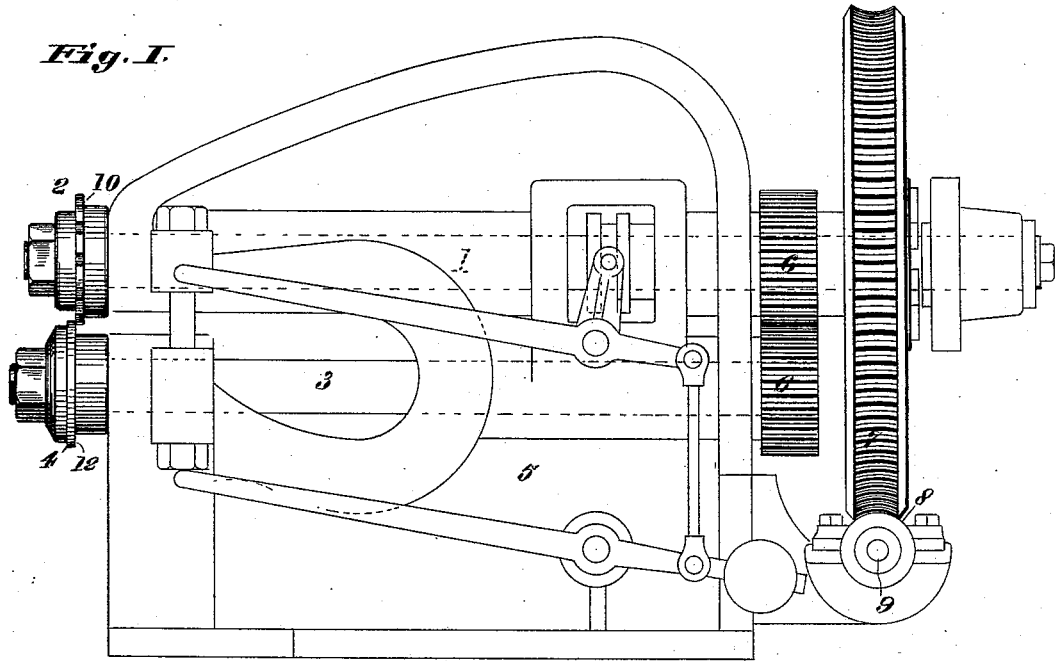
Fig. II.
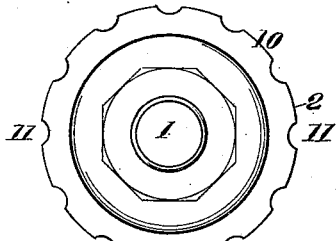
Fig. III.
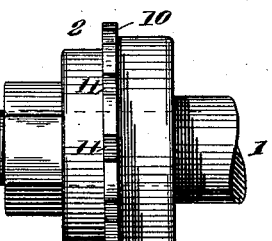
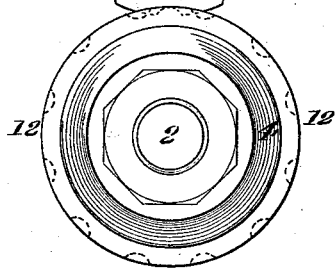
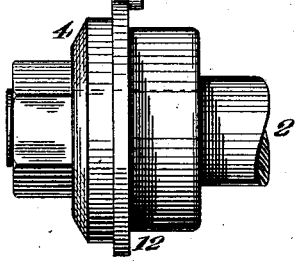
Attest:
Geo. E. Cruse
Edward R. Knight
Inventor:
Philip Rohan
By Knight Bros
attys

UNITED STATES PATENT OFFICE.

PHILIP ROHAN, OF ST. LOUIS, MISSOURI.

SHEARING-MACHINE.

SPECIFICATION forming part of Letters Patent No. 478,023, dated June 28, 1892.

Application filed March 9, 1892. Serial No. 424,313. (No model.)

*To all whom it may concern:*

Be it known that I, PHILIP ROHAN, of the city of St. Louis, in the State of Missouri, have invented a certain new and useful Improvement in Shearing-Machines, of which the following is a full, clear, and exact description, reference being had to the accompanying drawings, forming part of this specification.

My invention relates to a machine intended more particularly for shearing or cutting sheets of metal; and my invention consists in features of novelty hereinafter fully described, and pointed out in the claims.

Figure I is a side elevation illustrative of my invention. Fig. II is an enlarged end view of the feeding and cutting disks or plates. Fig. III is an elevation of the same.

Referring to the drawings, 1 represents a shaft upon which the upper feeder or cutter 2 is mounted, and 3 a shaft upon which the lower cutter is mounted. These shafts may be supported in any suitable kind of a frame and are turned or operated by any suitable form of mechanism. I have shown them supported in the frame 5, and as a means for operating them I have shown them connected by pinions 6 with a worm-wheel 7 on one of them, which is engaged by a worm 8 on a driving-shaft 9.

The combined feeder and cutter 2 consists of a disk or circular plate 10, having a flat peripheral surface free from sharp points, in which are made notches 11, the plain parts between the notches being wider than the same, and said notches cause the disk to grip the sheet of metal and feed it through the machine. The cutter 4 consists of a single disk or circular plate 12, having a flat periphery, and which fits on one side only of the feeder, as shown clearly in Figs. I and III. This disk or plate 12 may have notches 11 in its periphery, if desired, as shown by dotted lines, Fig. II, which notches would be located so as to come opposite the spaces between the notches of disk 10 as the disks revolve. By thus notching the lower disk, as well as the upper one, it assists the upper one in feeding the sheet of metal through the machine, while the cutting is not interfered with, because the notches of the two disks do not come opposite each other.

I have found by practical demonstration that for cutting certain metals and certain thicknesses of metal a cutter fitting on one side only of the combined feeder and cutter element has certain advantages over a cutter fitting on both sides of the feeder, as in the application of Charles Kieser, filed August 29, 1891, Serial No. 404,137, allowed November 30, 1891, and in which I am interested.

I claim as my invention—

1. In a shearing-machine, the combination of a circular plate or disk having a flat notched periphery free from sharp points between the the notches, a plate or disk having a flat periphery and fitting on one side only of the notched plate or disk, and operating mechanism, substantially as and for the purpose set forth.

2. In a shearing-machine, the combination of an upper circular plate or disk having a flat notched periphery, a lower circular plate or disk having a flat notched periphery and fitting on one side only of the upper plate or disk, and operating mechanism, the parts of said plates or disks between the notches being plain or free from sharp points, and the plates or disks being so arranged that the notches of one disk will come opposite the plain parts of the other disk, substantially as and for the purpose set forth.

PHILIP ROHAN.

In presence of—
  A. M. EBERSOLE,
  ED. S. KNIGHT.